US012347273B2

(12) United States Patent
Huke et al.

(10) Patent No.: US 12,347,273 B2
(45) Date of Patent: *Jul. 1, 2025

(54) METHOD OF REWARDING NON-DANGEROUS BEHAVIOR

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US); Michael Baker, Georgie, VT (US)

(73) Assignee: AdrenalineIP, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,340

(22) Filed: Aug. 2, 2022

(65) Prior Publication Data

US 2022/0375303 A1 Nov. 24, 2022

Related U.S. Application Data

(62) Division of application No. 17/120,562, filed on Dec. 14, 2020, now Pat. No. 11,410,502.

(60) Provisional application No. 63/111,786, filed on Nov. 10, 2020, provisional application No. 63/082,736, filed on Sep. 24, 2020.

(51) Int. Cl.
*G07F 17/32* (2006.01)

(52) U.S. Cl.
CPC ...... *G07F 17/3262* (2013.01); *G07F 17/3288* (2013.01)

(58) Field of Classification Search
CPC ........................... G07F 17/3288; G06Q 50/34
See application file for complete search history.

(56) References Cited

U.S. PATENT DOCUMENTS 5,987,101 A 11/1999 Rathore
6,612,579 B1 9/2003 Cembruch
7,029,395 B1 4/2006 Baerlocher
7,942,734 B2 5/2011 Alderucci
11,205,320 B1 12/2021 Huke et al.
11,410,502 B2 * 8/2022 Huke ................. G07F 17/3262
2004/0235542 A1 11/2004 Stronach et al.
2005/0283401 A1 12/2005 Swix et al.
2006/0094506 A1 5/2006 Tarter et al.
2008/0076542 A1 3/2008 Iddings et al.
(Continued)

FOREIGN PATENT DOCUMENTS

AU 2017100704 A4 * 7/2013

OTHER PUBLICATIONS

Notification of Transmittal of the International Search Report and the Written Opinion of the International Searching Authority issued on Dec. 27, 2021, in connection with corresponding international Application No. PCT/US21/51917, 11pgs.
(Continued)

*Primary Examiner* — Milap Shah
(74) *Attorney, Agent, or Firm* — Maier & Maier, PLLC

(57) ABSTRACT

Improving the profitability of an in-play betting system by identifying high frequency and high wager amount users and promoting an increase in wager amount or frequency by offering incentives to increase a user's wager amount, if identified to be a high frequency bettor or wager frequency, if identified to be a high wager amount bettor.

2 Claims, 8 Drawing Sheets

| User ID | Event ID | Timestamp | Wager Amount | Initial Odds | Offered Odds | Incentive | Outcome | Inning |
|---|---|---|---|---|---|---|---|---|
| 1165 | 265 | 6/20/2020 14:20:30 | $ 200.00 | 500 | 520 | Increase odds 20 | Home Run | Top 8th |
| 1165 | 265 | 6/20/2020 14:23:46 | $ 150.00 | 200 | 220 | Increase odds 20 | Base Hit | Top 8th |
| 1165 | 265 | 6/20/2020 14:36:02 | $ 25.00 | 400 | 400 | Increase Payment Threshold $50 | Strikeout | Bottom 8th |
| 1165 | 265 | 6/20/2020 14:41:47 | $ 75.00 | 300 | 300 | Increase Payment Threshold $50 | Strikeout | Bottom 8th |
| 1165 | 265 | 6/20/2020 14:50:21 | $ 150.00 | 300 | 320 | Increase odds 20 | Base Hit | Top 9th |
| 1165 | 265 | 6/20/2020 15:11:16 | $ 250.00 | 400 | 420 | Increase odds 20 | RBI | Bottom 9th |
| 1165 | 269 | 6/21/2020 13:45:19 | $ 25.00 | 300 | 300 | Increase Payment Threshold $50 | Base Hit | Bottom 4th |
| 1165 | 269 | 6/21/2020 13:50:35 | $ 72.00 | 200 | 200 | Increase Payment Threshold $50 | Strikeout | Bottom 4th |
| 1165 | 269 | 6/21/2020 14:03:14 | $ 50.00 | 300 | 300 | Increase Payment Threshold $50 | Base Hit | Top 5th |
| 1165 | 269 | 6/21/2020 14:09:26 | $ 50.00 | 500 | 500 | Increase Payment Threshold $50 | Strikeout | Top 5th |

(56) References Cited

U.S. PATENT DOCUMENTS

| | | | |
|---|---|---|---|
| 2008/0182655 | A1 | 7/2008 | Dewaal et al. |
| 2009/0172035 | A1 | 7/2009 | Lessing et al. |
| 2013/0157735 | A1 | 6/2013 | Amaitis et al. |
| 2013/0196753 | A1 | 8/2013 | Miller |
| 2015/0005060 | A1 | 1/2015 | Shankar et al. |
| 2015/0221177 | A1 | 8/2015 | Glancy |
| 2015/0262456 | A1 | 9/2015 | Shore et al. |
| 2015/0379816 | A1 | 12/2015 | Hayon |
| 2016/0027247 | A1 | 1/2016 | Low et al. |
| 2016/0117888 | A1 | 4/2016 | Marantelli |
| 2016/0217651 | A1 | 7/2016 | Emura |
| 2016/0267747 | A1 | 9/2016 | Dengler et al. |
| 2017/0103615 | A1 | 4/2017 | Theodosopoulos |
| 2017/0193736 | A1 | 7/2017 | Martino |
| 2018/0005492 | A1 | 1/2018 | Hall |
| 2018/0190077 | A1 | 7/2018 | Hall et al. |
| 2019/0244485 | A1 | 8/2019 | Jones |
| 2019/0295382 | A1 | 9/2019 | Huke |
| 2019/0362601 | A1 | 11/2019 | Kline et al. |
| 2020/0020203 | A1 | 1/2020 | Jordan |
| 2020/0111325 | A1 | 4/2020 | Lockton et al. |
| 2020/0126363 | A1 | 4/2020 | Trepp et al. |
| 2020/0234536 | A1 | 7/2020 | Azzam et al. |
| 2020/0234543 | A1 | 7/2020 | Schwartz et al. |
| 2021/0248706 | A1 | 8/2021 | Huke et al. |
| 2021/0358270 | A1 | 11/2021 | Wexler et al. |
| 2022/0005321 | A1 | 1/2022 | Wexler et al. |
| 2022/0028223 | A1 | 1/2022 | Huke et al. |

OTHER PUBLICATIONS

Hing, N., Russell, A. M. T., Lamont, M., & Vitartas, P. (2017). Betanywhere, anytime: An analysis of Internet sports bettors' responses to gambling promotions during sports broadcasts by problem gambling severity. Journal of Gambling Studies. 15 Pages. (Year: 2017).

Hing, N., Sproston, K., Brading, R., & Brook, K. (2015). Review and analysis of sports and race betting inducements. Melbourne, Australia: Victorian Responsible Gambling Foundation. 128 Pages. (Year: 2015).

Rockloff, J., Matthew. Brown, M. Russell, A. Hing, N. Geer, N. (2019). Sports betting incentives encourage gamblers to select the long odds: An experimental investigation using monetary rewards. Journal of Behavioral Addictions. (Year: 2019).

* cited by examiner

| User ID | Event ID | Timestamp | Wager Amount | Initial Odds | Offered Odds | Incentive | Outcome | Inning |
|---|---|---|---|---|---|---|---|---|
| 1165 | 265 | 6/20/2020 14:20:30 | $ 200.00 | 500 | 520 | Increase odds 20 | Home Run | Top 8th |
| 1165 | 265 | 6/20/2020 14:23:46 | $ 150.00 | 200 | 220 | Increase odds 20 | Base Hit | Top 8th |
| 1165 | 265 | 6/20/2020 14:36:02 | $ 25.00 | 400 | 400 | Increase Payment Threshold $50 | Strikeout | Bottom 8th |
| 1165 | 265 | 6/20/2020 14:41:47 | $ 75.00 | 300 | 300 | Increase Payment Threshold $50 | Strikeout | Bottom 8th |
| 1165 | 265 | 6/20/2020 14:50:21 | $ 150.00 | 300 | 320 | Increase odds 20 | Base Hit | Top 9th |
| 1165 | 265 | 6/20/2020 15:11:16 | $ 250.00 | 400 | 420 | Increase odds 20 | RBI | Bottom 9th |
| 1165 | 269 | 6/21/2020 13:45:19 | $ 25.00 | 300 | 300 | Increase Payment Threshold $50 | Base Hit | Bottom 4th |
| 1165 | 269 | 6/21/2020 13:50:35 | $ 72.00 | 200 | 200 | Increase Payment Threshold $50 | Strikeout | Bottom 4th |
| 1165 | 269 | 6/21/2020 14:03:14 | $ 50.00 | 300 | 300 | Increase Payment Threshold $50 | Base Hit | Top 5th |
| 1165 | 269 | 6/21/2020 14:09:26 | $ 50.00 | 500 | 500 | Increase Payment Threshold $50 | Strikeout | Top 5th |

Fig. 2

| ID | Timestamp | Frequency | Amount |
|---|---|---|---|
| 1165 | 6/20/2020 14:20:30 | Yes | Yes |
| 2314 | 6/20/2020 14:23:46 | Yes | No |
| 1324 | 6/20/2020 14:36:02 | No | Yes |
| 3365 | 6/20/2020 14:41:47 | Yes | Yes |
| 2635 | 6/20/2020 14:50:21 | Yes | No |
| 1354 | 6/20/2020 15:11:16 | No | Yes |
| 3254 | 6/21/2020 13:45:19 | No | Yes |
| 2546 | 6/21/2020 13:50:35 | Yes | No |
| 2135 | 6/21/2020 14:03:14 | Yes | No |
| 1324 | 6/21/2020 14:09:26 | Yes | Yes |

Fig. 5

METHOD OF REWARDING NON-DANGEROUS BEHAVIOR

FIELD

The embodiments are generally related to wagering on live sporting events, specifically increasing profitability and decreasing risk of an in-play betting system.

BACKGROUND

While high frequency and high wager amount bettors represent a significant portion of a wagering network's profits, it rarely represents the majority. Despite this, it is generally easier to increase the engagement of established users than to draw new users to a wagering network. Similarly, it is easier and there is a higher likelihood of success in increasing the engagement of high frequency and high wager amount bettors than their less frequent or lower amount counterparts.

High frequency low wager amount bettors can be very profitable for wagering networks which collect a flat fee for each wager, however some wagering networks collect a percentage of the amount wagered. For these wagering networks, encouraging their users to increase their wager amount could result in a substantial increase in profits.

Low frequency high wager amount bettors can be very profitable for wagering networks which collect a percentage of the amount wagered, however increasing the frequency of wagers will result in a substantial increase in the profitability of the wagering network.

SUMMARY

The embodiments include methods, systems, and apparatuses for incentivizing user interaction. One embodiment includes a system for incentivizing user interaction for in play sports betting, including a connection to a live event, a connection to a cloud, a connection to a mobile device, a wagering network connected through the cloud to a mobile device, a bettor classification module, a large bettor database, and an incentive module, where the wagering network creates odds for each play and provides one or more incentives to large bettors in the large bettor database to wager on a single play in a live sporting event.

In another embodiment, a method of providing wagers for a play in a live sporting event on a play by play wagering network, including executing on a processor the steps of displaying a wagering game; displaying one or more first odds for a wager on a single play in the live sporting event; displaying a notification that an incentive has been earned; and displaying a notification of one or more second odds for the wager on the single play in the live sporting event.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 2 illustrates a historical wager database, according to an embodiment.

FIG. 5 illustrates a large bettor database, according to an embodiment.

DETAILED DESCRIPTION

Figure 1:
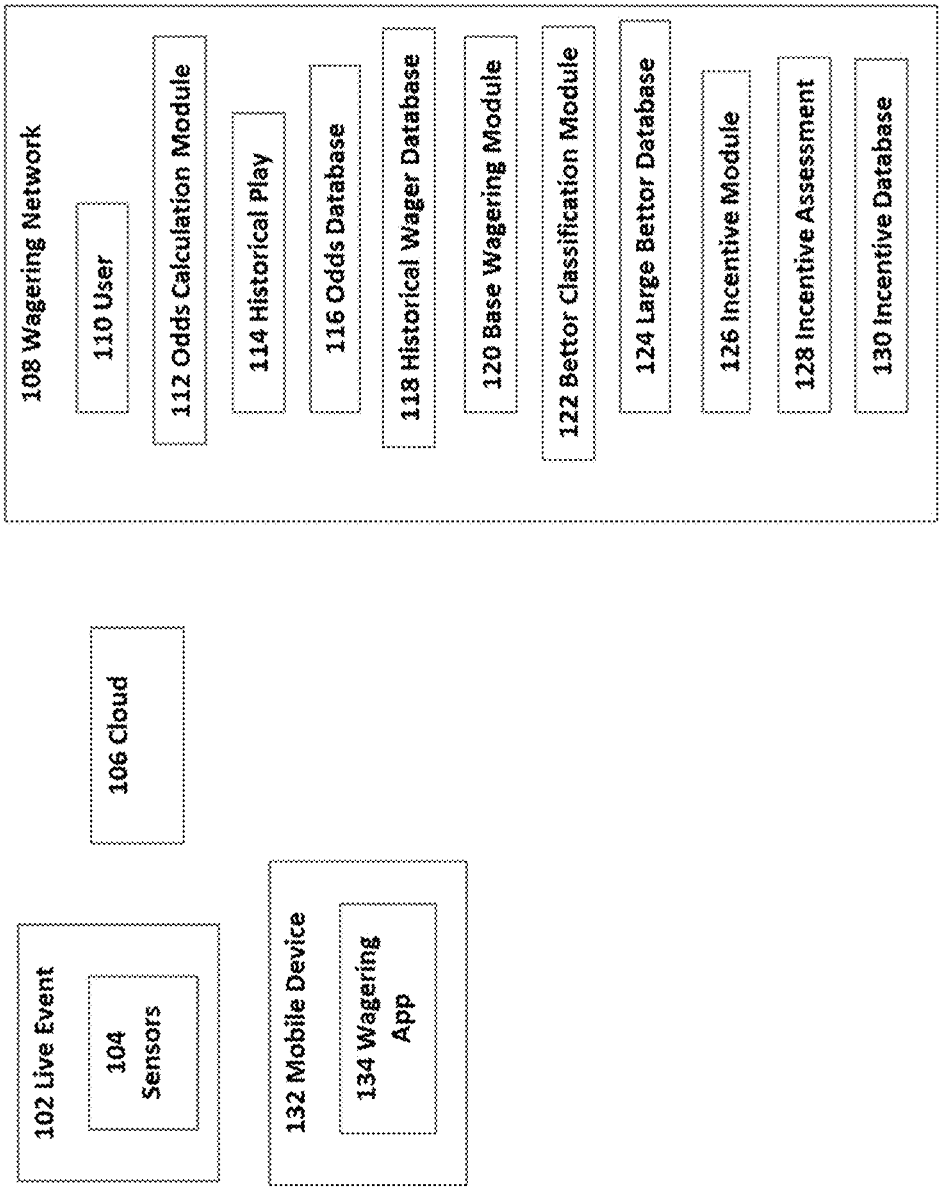
FIG. 1 illustrates a wager reward method, according to an embodiment.

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they do not, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access, and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

“Fantasy sports connector” are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a “fumble” could be recognized and at the time stamp of the event, metadata such as “fumble” could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user’s view of the real world, thus providing a composite view. In an example of this invention, a real time view of the game can be seen and a “bet” which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms “a,” “an,” and “the” include plural references unless the context clearly dictates otherwise. Although any systems and methods similar or equivalent to those described herein can be used in the practice or testing of embodiments, only some exemplary systems and methods are now described.

FIG. 1 is a system for a wager reward method. This system comprises of a live event 102, for example a sporting event such as a football game, basketball game, baseball game, hockey game, tennis match, golf tournament, eSports, or digital game, etc. The live event will include some number of actions or plays, upon which a user or bettor or customer can place a bet or wager, typically through an entity called a sportsbook. There are numerous types of wagers the bettor can make, including, a straight bet, a money line bet, a bet with a point spread or line that bettor’s team would need to cover, if the result of the game was the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers, and prop bets, that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event 102, such as the score of American football or the run line in baseball, or a series of action in the live event 102. Sportsbooks have a number of bets they can handle, and a limit of wagers they can take on either side of a bet before they will move the line or odds off of the opening line. Additionally, there are circumstance, such as an injury to an important player such as a listed pitcher, in which a sportsbook, casino or racino will take an available wager off the board. As the line moves there becomes an opportunity for a gambler to bet on both sides at different point spreads in order to middle and win both bets. Sportsbooks will often offer bets on portions of games, such as first half bets and half-time bets. Additionally, the sportsbook can offer futures bets on the live events 102 in the future. Sportsbooks need to offer payment processing services in order to cash out customers. This can be done at kiosks at the live event 102 or at another location.

Further, embodiments may include a plurality of sensors 104 that may be used such as motion sensors, temperature sensors, humidity sensors, cameras such as an RGB-D Camera which is a digital camera capturing color (RGB) and depth information for every pixel in an image, microphones, a radiofrequency receiver, a thermal imager, a radar device, a lidar device, an ultrasound device, a speaker, wearable devices etc. Also, the plurality of sensors 104 may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that captures statistical information through real-time X, Y positioning of players and X, Y, Z positioning of the ball.

Further, embodiments may include a cloud 106 or communication network which may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, such as over the Internet, and relies on sharing of resources to achieve coherence and economies of scale, like a public utility, while third-party clouds enable organizations to focus on their core businesses instead of expending resources on computer infrastructure and maintenance. The cloud 106 may be communicatively coupled to a wagering network 108 which may perform real time analysis on the type of play and the result of the play. The cloud 106 may also be synchronized with game situational data, such as the time of the game, the score, location on the field, weather conditions, and the like which may affect the choice of play utilized. For example, in some exemplary embodiments, the cloud 106 may not receive data gathered from the plurality of sensors 104 and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein.

Further, embodiments may include the wagering network 108 which may perform real time analysis on the type of play and the result of a play or action. The wagering network 108 (or cloud 106) may also be synchronized with game situational data, such as the time of the game, the score, location on the field, weather conditions, and the like which may affect the choice of play utilized. For example, in some exemplary embodiments, the wagering network 108 may not receive data gathered from the plurality of sensors 104 and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein. The wagering network 108 may offer a number of software as a service managed services such as, user interface service, risk management service, compliance, pricing and trading service, IT support of the technology platform, business applications, game configuration, state based integration, fantasy sports connection, integration to allow the joining of social media, and marketing support services that can deliver engaging promotions to the user.

Further, embodiments may utilize a user database 110 which contains data relevant to all users of the system, which may include, a user ID, a device identifier, a paired device identifier, wagering history, and wallet information for each user.

Further, embodiments may include an odds calculation module 112 which utilizes historical play data to calculate odds for in-play wagers.

Further, embodiments may include a historical play database 114, that contains play data for the type of sport being played in the live event 102. For example, in American Football, for optimal odds calculation, the historical play data should include meta data about the historical plays, such as time, location, weather, previous plays, opponent, physiological data, etc.

Further, embodiments may utilize an odds database 116 that contains the odds calculated by the odds calculation module 112, and the multipliers for distance and path deviation, and is used for reference by a base wagering module 120 and to take bets from the user through a user interface and calculate the payouts to the user.

Further, embodiments may utilize a historical wager database 118 that contains wagers from the live events 102. Wagers may include a wager amount, odds, and an outcome such that a payout in the amount of the wager amount multiplied by the odds will be paid to a user if the outcome wagered on occurs, otherwise the wager amount being lost. The historical wager database 118 may additionally contain contextual data about the state of the live event 102 when the wager was placed.

Further, embodiments may include the base wagering module 120 which allows a user to log into the wagering network 108 and retrieve available wagers from the odds database 116. The base wagering module 120 prompting a bettor classification module 122 which classifies the user as a high frequency bettor if their wager frequency exceeds a threshold or a high wager amount bettor if their average wager amount exceeds a threshold and saves the user's large bettor status to a large bettor database 124. The base wagering module 120 may further prompt an incentive module 126 which uses the user's large bettor status to determine an incentive to offer to the user when displaying available wagers, such as improving the odds to encourage the user to increase their wager amount or their wager frequency. It then receives a wager from the user, polls for play completion and compares the results of the play to the wager to determine whether the user won or lost the wager and saves the wager data to the historical wager database 118 and adjusts the user's account balance in the user database 110. If the live event 102 is complete, ending the program, otherwise repeating the base wagering module 120.

Further, embodiments may include the bettor classification module 122 which updates the large bettor database 124 with whether a user is a high frequency bettor or a high wager amount bettor. The bettor classification module 122 runs routinely, which may include after each play, after each number of plays, after a period of time, or be based upon some financial change (such as when the system's rate of profit is reducing) etc. This module may find large bettors by classifying all users by collecting data related to the number of wagers and the amount of each wager. The classification can be, but is not limited to, a number of bets, such as the top 10% of the bettors, bettors with more than 20 bets in a given period of time, bettors with an increasing trend in wagers placed over time, etc. The classification can be, but is not limited to, an amount of bets, such as the top 10% of users' wager amount for an individual bet, bettors with more than $2000 worth of bets in a given period of time, bettors with an increasing trend in the amount of wagers placed over time, etc. The bettor classification module 122 may also use a hybrid classification such as a combination of the classification by number of bets and the classification by wager amount.

Further, embodiments may include the large bettor database 124 which stores data calculated by the bettor classification module 122. The large bettor database 124 may include user IDs, whether the user is a high frequency bettor or a high wager amount bettor and may additionally include a time stamp indicating when the user was most recently classified as a large bettor.

Further, embodiments may include the incentive module 126 which retrieves a user's large bettor status from the large bettor database 124 and determines an incentive to offer to a user to increase their wager amount if a high frequency bettor or their wager frequency if a high wager amount bettor. Incentives are identified by an incentive assessment module 128 and saved to an incentive database 130 which is polled by the incentive module 126 to identify an incentive to provide the user to achieve a desired target wager frequency or wager amount as defined by the administrator of the wagering network 108.

Further, embodiments may include the incentive assessment module 128 which continuously polls the historical wager database 118 for a trigger condition such as the conclusion of a play or before or at the conclusion of the live event 102 or at specific time intervals which may be defined by the administrator of the wagering network 108. The incentive module 128 further queries the historical wager database 118 for historical wager data and performs correlations between data parameters to identify combinations of parameters which have a correlation coefficient exceeding a predetermined threshold. The incentive assessment module 128 saves the correlations to an incentive database 130.

Further, embodiments may include the incentive database 130 which stores correlation data calculated by the incentive assessment module 128.

Further, embodiments may include a mobile device 132 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WIT U GAMEPAD, or Apple IPHONE. Some devices allow gesture recognition inputs through combining some of the inputs and outputs. Some devices allow for facial recognition which may be utilized as an input for different purposes including authentication and other commands. Some devices provides for voice recognition and inputs, including, e.g., Microsoft KINECT, SIRI for IPHONE by Apple, Google Now or Google Voice Search. Additional user devices may have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also contain storage and/or an installation medium for the computing device. In some embodiments, the computing device may include USB connections (not shown) to receive hand-held USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fiber Channel bus, or a Thunderbolt bus. In some embodiments the mobile device 132 could be an optional component and would be utilized in a situation in which a paired wearable device is utilizing the mobile device 132 as additional memory or computing power or connection to the internet.

Further, embodiments may include a wagering app 134, which is a program that enables the user to place bets on individual plays in the live event 102, and display the audio and video from the live event 102, along with the available wagers on the mobile device 132. The wagering app 134 allows the user to interact with the wagering network 108 in order to place bets and provide payment/receive funds based on wager outcomes.

FIG. 2 illustrates the historical wager database 118. The historical wager database 118 stores data about wagers placed by users during the live event 102 including prior events. The data may include any of a user ID, wager amount, event ID and time stamps indicating when the wager was placed. The user ID identifying the user of the wagering network 108 who placed the wager, a wager amount is a monetary value wagered by the user, the event ID identifying the live event 102 during which the wager was placed. The data may additionally include initial odds, offered odds, and an outcome where the initial odds are the odds calculated by the odds calculation module 112, the offered odds are the odds offered to a user. A wager is won if the outcome, the result of a play, wagered upon by the user occurs. The historical wager database 118 may further include situational context about the live event 102 when the wager was placed. In a baseball game, the situational context data may include the inning, teams playing, players batting, on deck pitching or playing in the field, score, balls, strikes, etc. The historical wager database 118 is populated by the base wagering module 120 and is used by the bettor classification module 122 to classify users as high frequency bettors or high wager amount bettors and the incentive assessment module 128 to identify correlations in parameters such that the increase of one parameter can increase the correlated parameter as set by the administrator of the wagering network 108.

Figure 3:
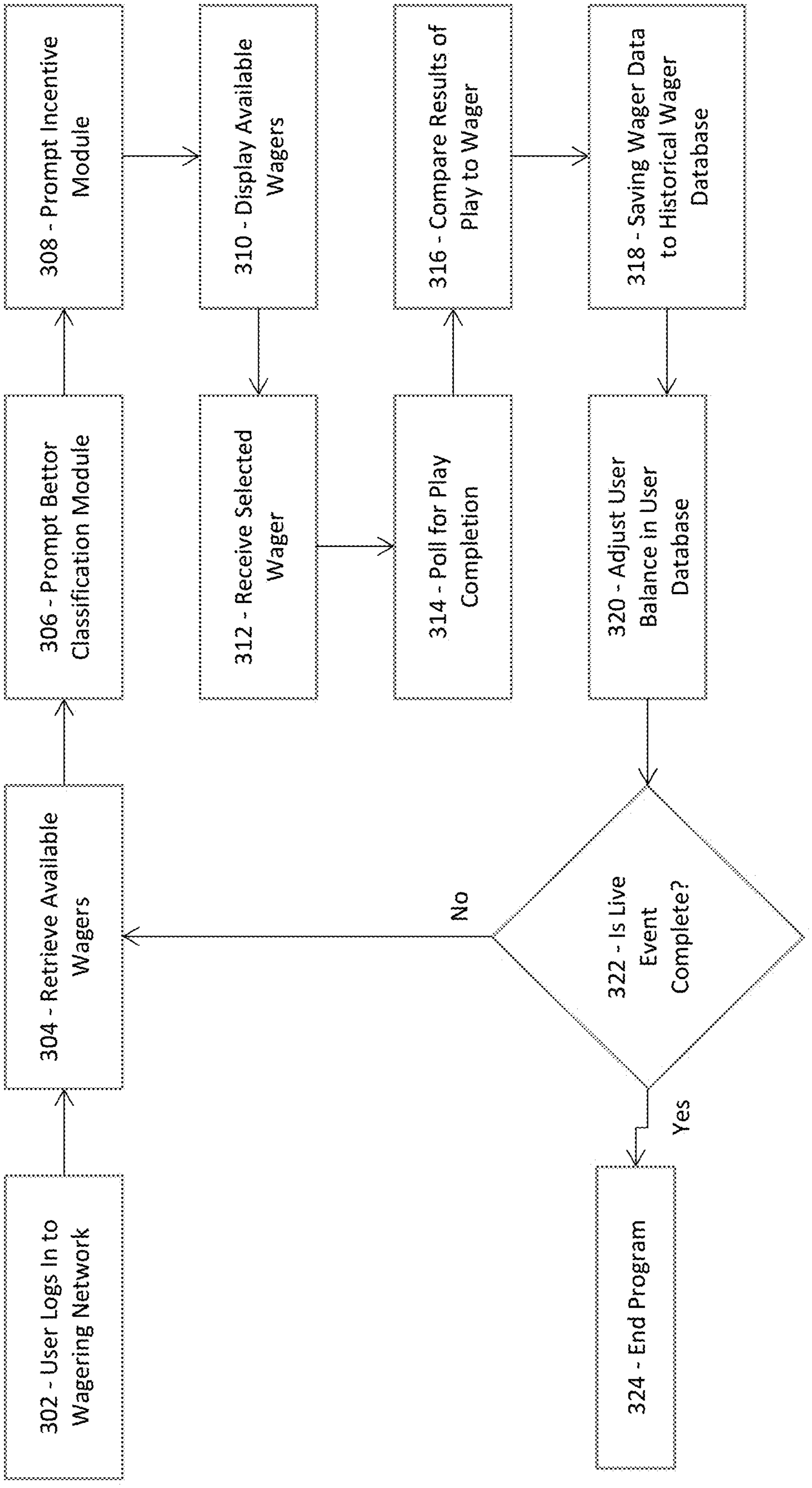
FIG. 3 illustrates a base wagering module, according to an embodiment.

FIG. 3 illustrates the base wagering module 120. The process begins with a user logging into, at step 302, the wagering network 108 via a user interface by entering a username and a password. In an embodiment, the username is an email address, and the password is a combination of alphanumeric characters. The module retrieves, at step 304, the currently available wagers from the odds database 116. The wagers may include an outcome and odds such that the outcome is the condition which must be met during the play to win the wager and the odds represent the multiple by which the wager amount placed by a user will be multiplied to determine the payout due to the user if the wager is won. The odds may alternatively be represented as a moneyline such that a positive number indicates the amount of money which will be won per $100 wagered and a negative number indicates the amount of money needed to wager to win $100. In a baseball game between the Boston Red Sox and the New York Yankees, an available wager is that the Red Sox pitcher, Eduardo Rodriguez, will strike out the next batter for the Yankees, Aaron Judge at odds of +500. The module prompts, at step 306, the bettor classification module 122. The bettor classification module 122 queries the historical wager database 118 for wager data for users of the wagering network 108 and determines the wager frequency of each user. The module further compares the wager frequency for each user to a frequency threshold and saving the user to the large bettor database 124 as a high frequency bettor if the user's wager frequency is higher than the frequency threshold. Additionally, the modules determines the average wager amount of each user and compares the average wager amount to an amount threshold and saves the user to the large bettor database 124 as a high wager amount bettor if the user's average wager amount is higher than the amount threshold, the module then returns to the base wagering module 120. The module prompts, at step 308, the incentive module 126. The incentive module 126 queries the large bettor database 124 for the large bettor status of the user and identifying whether the user is a high frequency bettor. If the user is a high frequency bettor, the incentive module 126 polls the incentive database 130 for an incentive to offer the user to increase their next wager amount. If the user is not a high frequency bettor, then the incentive module 126 identifies whether the user is a high wager amount bettor, and if so, polls the incentive database 130 for an incentive to offer the user to increase their wager frequency, such as the number of wagers placed per day. The base wagering module 120 displays, at step 310, available wagers to the user via the wagering app 132 on the mobile device 132. The available wagers may include an outcome and odds. The odds displayed are adjusted by the incentive module 126 if the user is a large bettor. In the example, the user Joe Smith is offered to wager that Red Sox pitcher Eduardo Rodriguez will strike out the next batter for the Yankees, Aaron Judge at odds of +520, increased by 20 from +500 because the user Joe Smith is a high wager amount bettor. The wagers may additionally include a default wager amount. The base wagering module 120 receives, at step 312, at least one wager from a user from the available wagers. The wager may include a wager amount, outcome, and odds. In the example, user Joe Smith bets $150 that Red Sox pitcher Eduardo Rodriguez will strike out Aaron Judge at odds of +520. The base wagering module 120 polls, at step 314, the plurality of sensors 104 for play completion. Completion of the play indicates that the result of the play can be acquired and compared to the outcome wagered on by the user. In the example, the play is complete when the batter for the Yankees, Aaron Judge, returns to the dugout or is standing on a base. The module compares, at step 316, the results of the play to the outcome wagered on by the user. The wager is won if the results of the play match the outcome wagered on by the user, while the wager is lost if the results of the play and the outcome wagered on by the user are different. In the example, the play resulted in the batter, Aaron Judge, hitting a fly ball to left field and the ball being caught by the Red Sox left fielder for an out. The user Joe Smith, having wagered $150 at +520 odds that Aaron Judge would strike out, lost the wager, as Aaron Judge did not strike out. The module saves, at step 320, wager data to the historical wager database 118. The wager data may include wager amount, odds, outcome, contextual information about the live event 102 and metadata from the wager such as a timestamp indicating when the wager was placed. The wager data may further include the result of the wager, such as whether the wager was won or lost and the payout or loss resulting from the wager. The saved data allows the bettor classification module 122 to determine whether a user is a high frequency bettor or a high wager amount bettor. The base module 120 adjusts, at step 320, the account balance of the user in the user database 110 based on the results of the wager. If the wager is won, then the account balance is increased in an amount equal to the payout. The payout is determined based upon the odds accepted when the user placed the wager. In the example the unmodified odds are +500 and if the wager amount is $150, the payout would be $750. If the wager amount was not debited from the account balance prior to play completion, then the account balance is adjusted by the difference between the wager amount and payout. Similarly, if the wager was lost and the wager amount was not previously debited from the account balance, the account balance is reduced by the wager amount. The module polls, at step 322, the plurality of sensors 104 for whether the live event 102 is complete. If the live event 102 is not complete, the module returns to step 304 and repeats the base wagering module 120 program. The program ends at step 324 if the live event 102 is complete.

Figure 4:
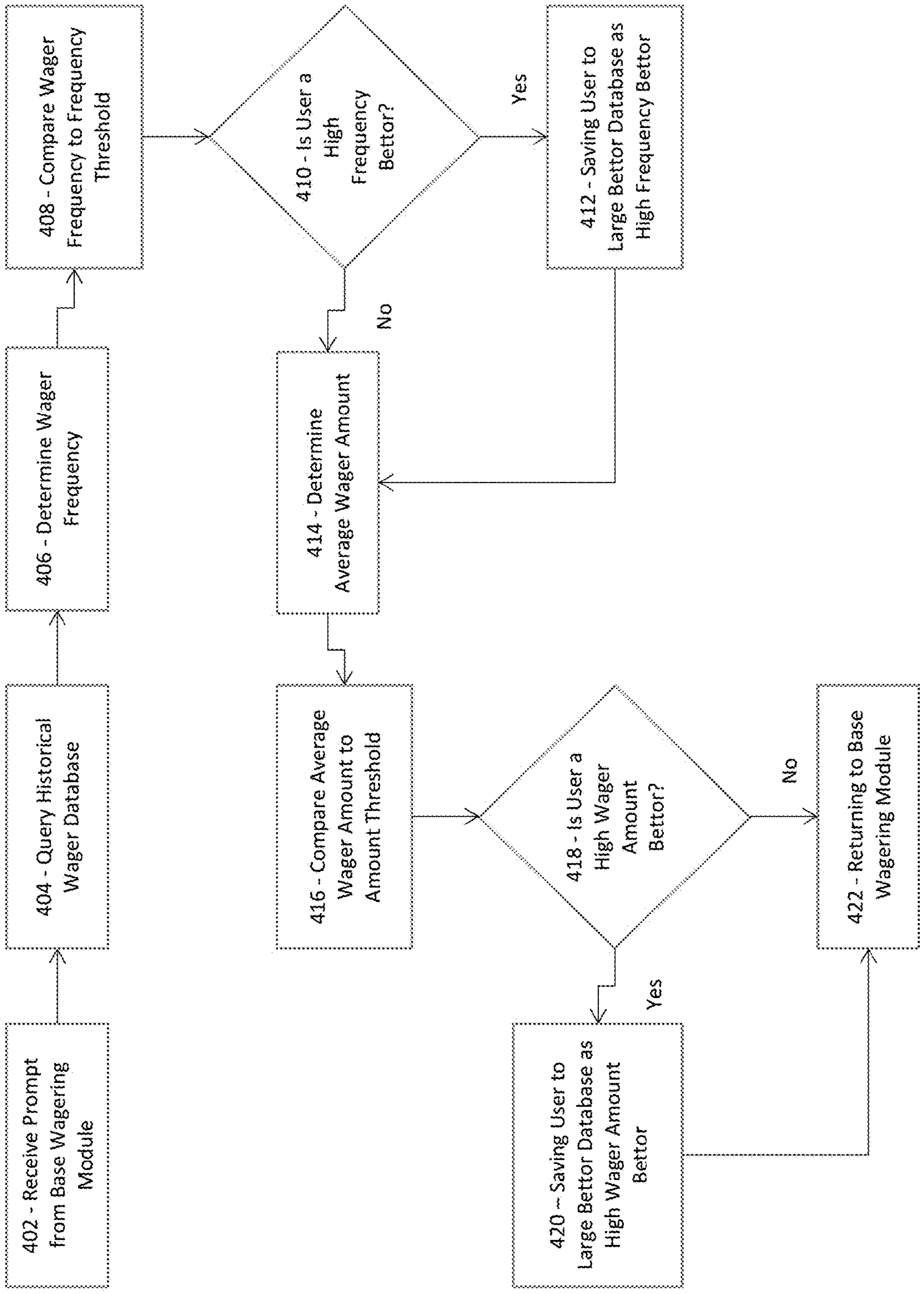
FIG. 4 illustrates a bettor classification module, according to an embodiment.

FIG. 4 illustrates the bettor classification module 122. The process begins with the module receiving, at step 402, a prompt from the base wagering module 120 and initiating. The bettor classification module 122 may run routinely, such as after each play, after each number of plays, after a period of time, or based upon some financial change (the system rate of profit is reducing) etc. The module queries, at step 404, the historical wager database 118 for historical wager data. The historical wager data may include the user's past wagers and may additionally include historical wager data for other users. The historical wager data may include user IDs, wager amounts, time stamps indicating when the wagers were placed, and additionally may include an event ID. The historical wager data may be used to determine wager frequency and an average wager amount for each user for which data is retrieved. The data may further be filtered based on the type of the live event 102, such as baseball game or American football game, and may additionally be filtered for a specific time period, such as the previous month. The module determines, at step 406, the wager frequency for each users' historical wagers. The wager frequency may be represented as wagers placed per period of time, such as week, day, hour etc. or per event or user session on a wagering app 134. The wager frequency is determined by counting the total number of wagers placed by a user and dividing it by the number of time units during which the wagers were placed as determined by the wager record time stamps. Alternatively, the event ID can be used to identify the wagers placed in a single event. In the example, user Joe Smith placed 98 wagers during the past two weeks and therefore averaged 14 wagers per day. The module compares, at step 408, the user's wager frequency to a frequency threshold. The frequency threshold may be set by an administrator of the wagering network 108 or by an algorithm. In this example, the frequency threshold is set by the administrator of the wagering network 108 to 10 wagers per day and the user Joe Smith, having averaged 14 wagers per day during the past two weeks, has a wager frequency greater than the frequency threshold. The frequency threshold may alternatively be defined by a relative rank among other users, such as the top 10% of all users' wager frequencies, or an increasing trend in the user's wager frequency, such as increasing by more than 10 wagers or 10% of wagers placed in the previous week. The module identifies, at step 410, whether the user is a high frequency bettor by whether the user's wager frequency is greater than the frequency threshold. As the user Joe Smith's wager frequency is 14 wagers per day which is greater than the frequency threshold of 10 wagers per day, the user Joe Smith is a high frequency bettor. The module saves, at step 412, the user to the large bettor database 124 as a high frequency bettor if the user is determined to be a high frequency bettor. The module determines, at step 414, each users' average wager amount. The average wager amount is determined by summing the wager amounts for a user's wagers and dividing the summed wager amounts by the total number of wagers placed. In the example, user Joe Smith placed 98 wagers during the past two weeks and the sum of all 98 wagers placed equals $12,250. User Joe Smith therefore has an average wager amount of $125 during the past two weeks. The modules compares, at step 416, the user's average wager amount to an amount threshold. The amount threshold may be set by an administrator of the wagering network 108 or by an algorithm. In this example, the frequency threshold is set by the administrator of the wagering network 108 at $100 per wager and the user Joe Smith, having an average wager amount of $125 has a wager amount greater than the amount threshold. The amount threshold may alternatively be defined by a relative rank among other users, such as the top 10% of all users' average wager amounts, or an increasing trend in the user's wager amount, such as increasing by more than $20 or 20% of wagers placed in the previous week. The module identifies, at step 418, whether the user is a high wager amount bettor by whether the user's average wager amount is greater than the amount threshold. As the user Joe Smith's average wager amount is $125 and the amount threshold is $100, the user Joe Smith is a high wager amount bettor. The module saves, at step 420, the user to the large bettor database 124 as a high wager amount bettor if the user is determined to be a high wager amount bettor. The module returns, at step 422, to the base wagering module 120.

FIG. 5 illustrates the large bettor database 124. The large bettor database 124 stores the large bettor status of users which may include a user ID, high frequency bettor status, high wager amount status, and a timestamp indicating the date and time when the bettor classification module 122 determined that the user was a large bettor. The high frequency bettor status indicates that the user places wagers at a frequency above a threshold or at a rate higher than most other users. The high wager amount bettor status indicates that the user places wagers which are, on average, larger than a threshold or their average wager amount is greater than most other users. The large bettor database 124 is used by the incentive module 126 to select the incentive to be offered to a user.

Figure 6:
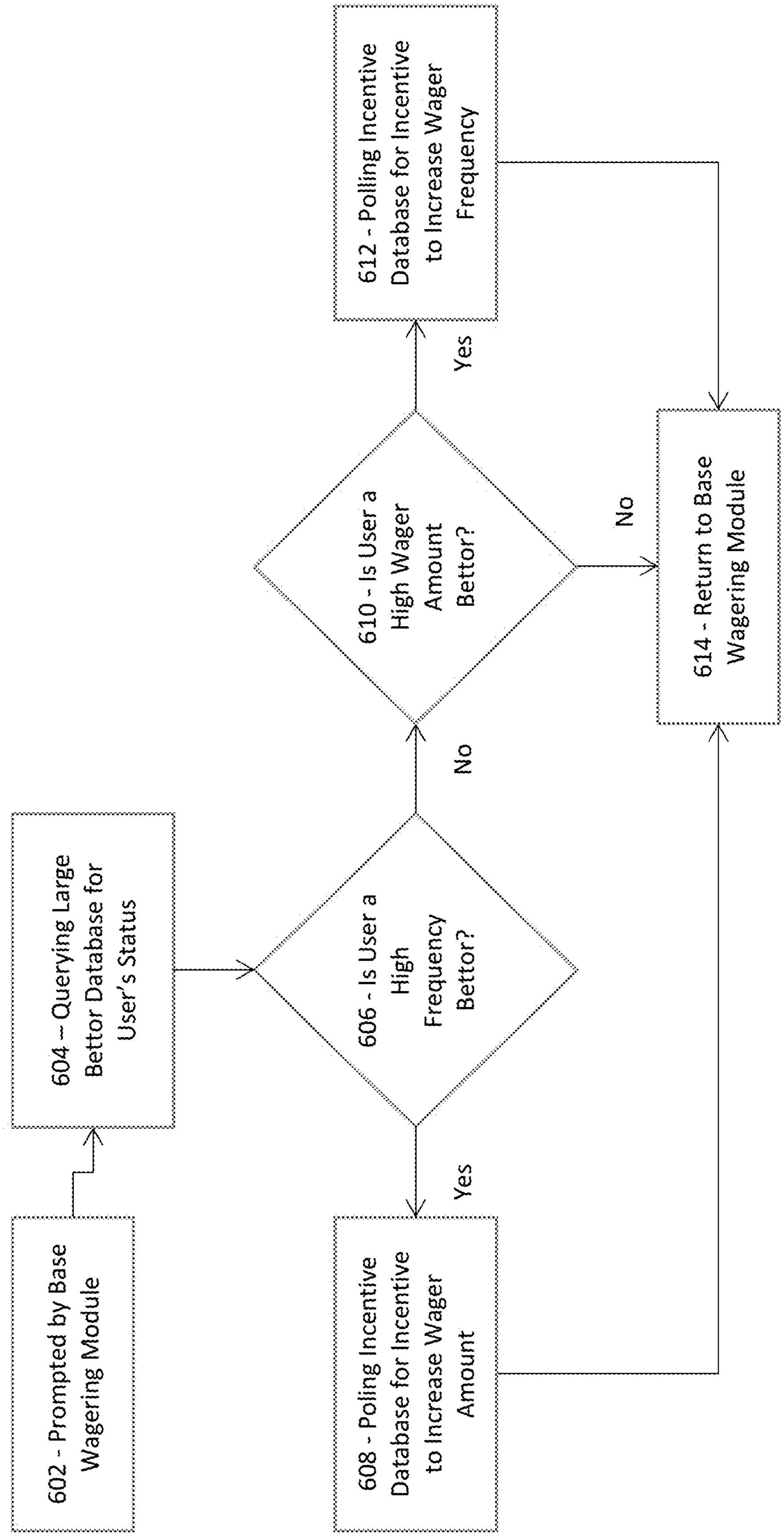
FIG. 6 illustrates an incentive module, according to an embodiment.

FIG. 6 illustrates the incentive module 126. The process begins with the module receiving, at step 602, a prompt from the base wagering module 120 which initiates the incentive module 126. The incentive module 126 determines what, if any, incentive to offer to the user to encourage the user to increase their wager frequency or wager amount. The module queries, at step 604, the large bettor database 124 for the user's large bettor status. The large better status may be a high frequency bettor or a high wager amount bettor. The module identifies, at step 606, whether the user is a high frequency bettor based on the user's large bettor status. A high frequency bettor is a user who places more wagers than most other users. The module polls, at step 608, the incentive database 130 for an incentive to offer the user to increase their wager amount to meet or exceed a target increase in wager amount set by the administrator of the wagering network 108 or an algorithm. The incentive is determined by identifying the parameter with the strongest correlation with an increase in wager amount as indicated by the highest correlation coefficient. In the example, an increase in sweepstakes entries has the strongest correlation with an increase in wager amount with a correlation coefficient of 0.78. A regression is then calculated to predict the additional number of sweepstakes entries to achieve the target increase in wager frequency, which in this example was predefined by the administrator of the wagering network 108 at an increase of $25. The result is three sweepstakes entries. The module identifies, at step 610, whether the user is a high wager amount bettor based on the user's large bettor status. A high wager amount bettor is a user who places larger wagers than most other users. The module polls, at step 612, the incentive database 130 for an incentive to offer the user to increase their wager frequency to meet or exceed a target increase in wager frequency set by the administrator of the wagering network 108 or an algorithm. The incentive is determined by identifying the parameter with the strongest correlation with an increase in wager frequency as indicated by the highest correlation coefficient. In the example, an increase in odds is correlated with an increase in wager frequency as represented by a correlation coefficient of 0.83. A regression is then calculated to predict the amount by which the odds must increase to achieve the target increase in wager frequency, which in this example was predefined by the administrator of the wagering network 108 at an increase of two wagers per day. The result is an odds increase of +40. The module returns to the base wagering module 120 with the incentive to be offered to the user. If the user is not a high frequency bettor nor a high wager amount bettor, then the module returns to the base wagering module 120 without an incentive and offers the user available wagers without providing an incentive.

Figure 7:
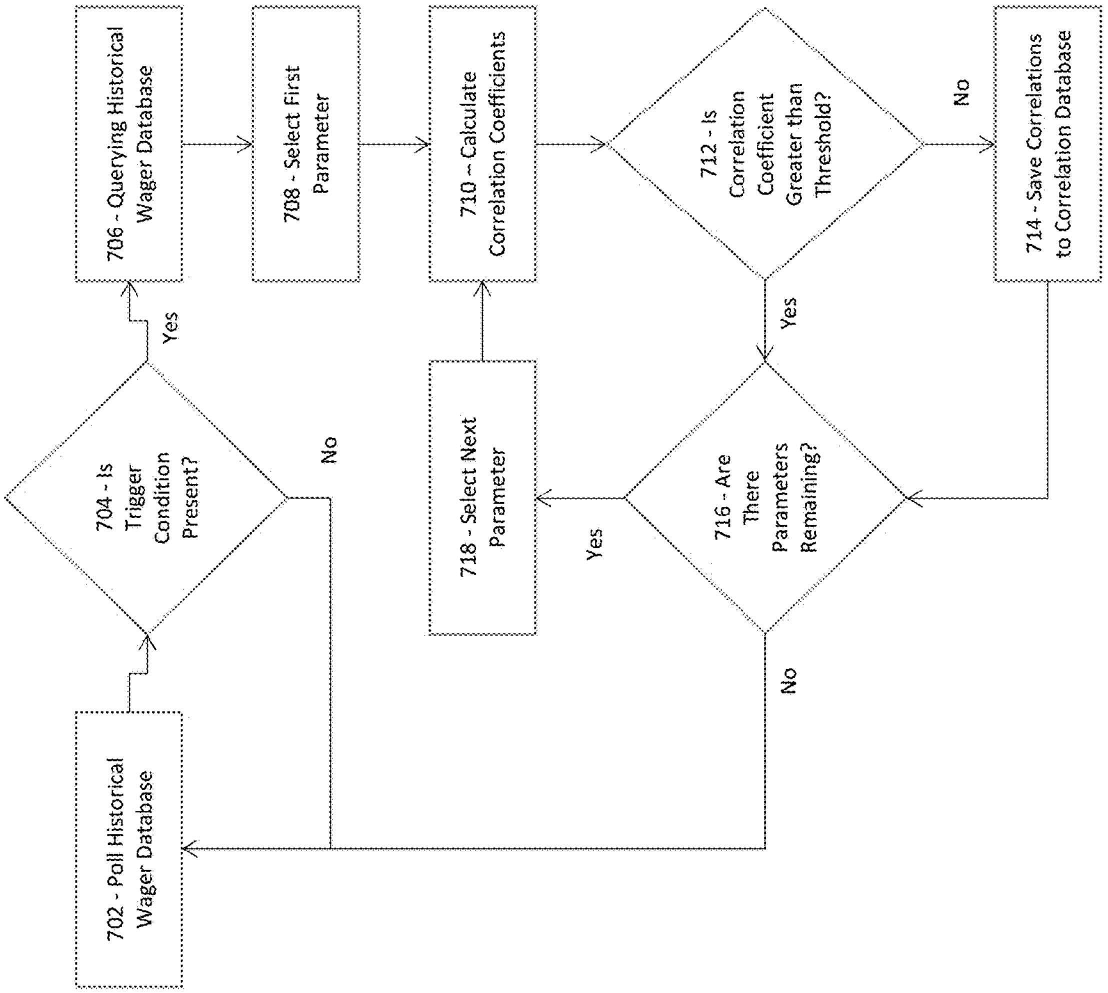
FIG. 7 illustrates an incentive assessment module, according to an embodiment.
Figure 8A:
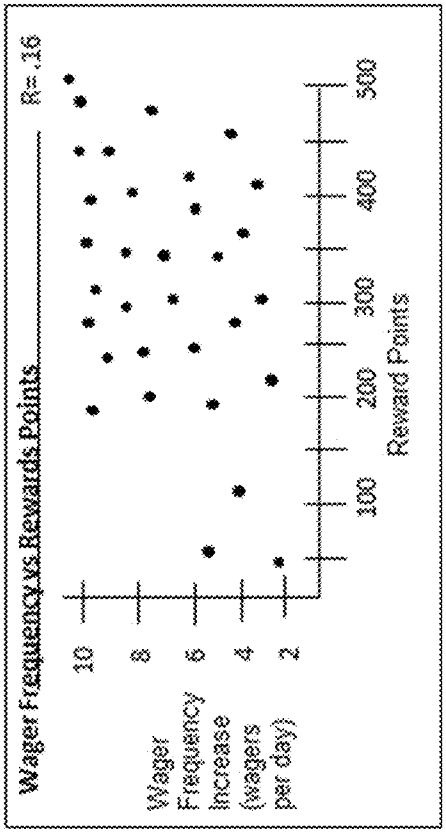
FIG. 8A illustrates an embodiment of an incentive database, according to an embodiment.
Figure 8B:
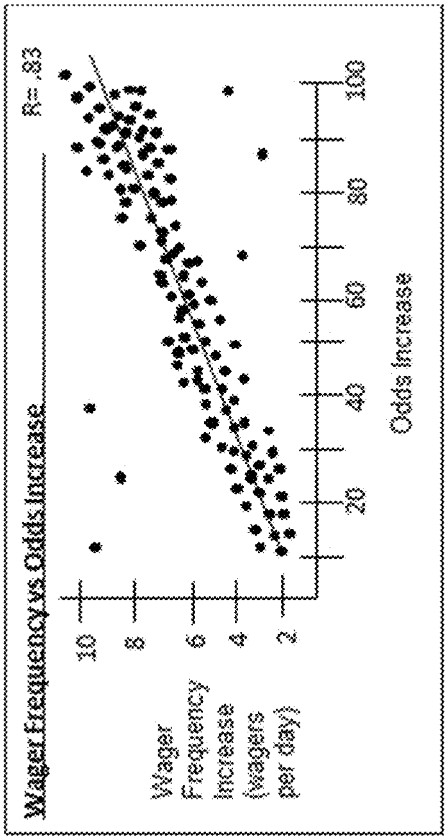
FIG. 8B illustrates an embodiment of an incentive database, according to an embodiment.
Figure 8C:
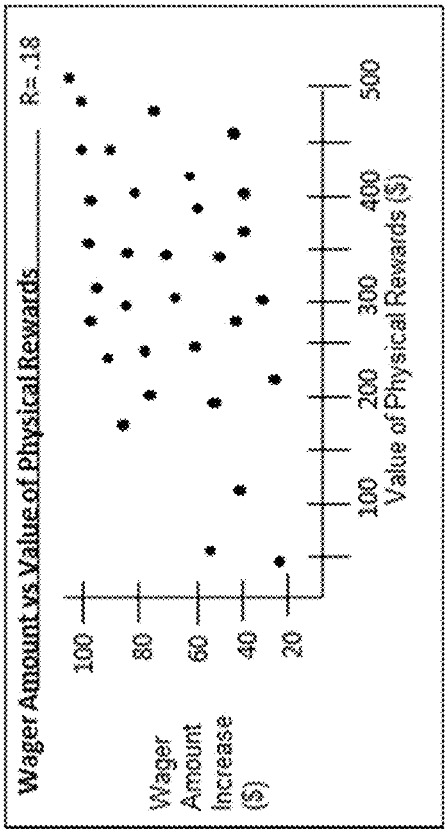
FIG. 8C illustrates an embodiment of an incentive database, according to an embodiment.
Figure 8D:
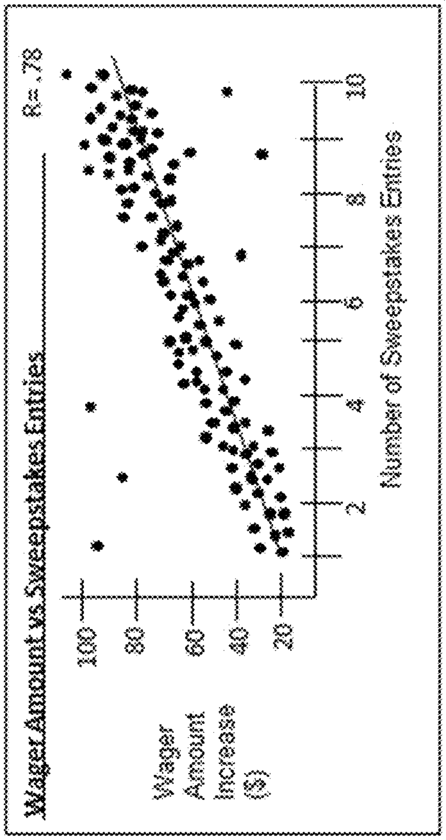
FIG. 8D illustrates an embodiment of an incentive database, according to an embodiment.

FIG. 7 illustrates the incentive assessment module 128. The process begins with the module polling, at step 702, the historical wager database 118 for a trigger condition. A trigger condition may be any of the conclusion of a play, a period of time which may be set by the administrator of the wagering network 108, at the beginning or end of the live event 102, or upon some financial change, such as the system rate of profit reducing, etc. In the example, the historical wager database 118 is triggered at the conclusion of each play when new wager data is saved to the historical wager database 118. The module checks, at step 704, for the presence of a trigger condition in the data stored in the historical wager database 118. The module determines the presence of a trigger condition, which may include a calculation step such as calculating the system rate of profit for a decreasing trend. In the example, the trigger condition is present when new wager data is saved to the historical wager database 118 when a play ends and the result of a wager is determined. The module queries, at step 706, the historical wager database 118 for historical wager data. The historical wager data may include past wagers for all users. The historical wager data may include user IDs, wager amounts, time stamps indicating when the wagers were placed, event IDs, incentives offered to users, context of the live event, etc. The historical wager data will be used to identify correlations between parameters to identify the parameters which result in a desired change in user behavior, such as increasing the frequency of wagers or increasing the amount of wagers. The data may be filtered based on type of the live event 102, such as baseball game or American football game, and may additionally be filtered for a specific time period, such as the previous month. The module selects, at step 708, a first parameter from the available parameters from the historical wager data. The parameter may include any of wager amount, odds, an outcome, contextual information from the live event 102, etc. The parameter may additionally be a value determined per user or per period of time such as wager frequency. In this example, the selected parameter is the wager frequency expressed as wagers placed per day. The module calculates, at step 710, a correlation coefficient for each pairing of the selected parameter and each unselected parameter. The correlation coefficient is a measure of the correlation between the selected parameter and a second parameter which can indicate the degree of influence of one parameter on the other. The closer a correlation coefficient is to 1, the stronger the implied positive influence such that increasing one parameter will similarly increase the second. In this example, the correlation coefficient of an increase in wager frequency in response to an increase in odds is 0.83. Additionally, the correlation coefficient of an increase in wager frequency in response to an increase in reward points awarded for a wager is 0.16. The correlation method used in this example is the Pearson r correlation, although any correlation method can be used. A negative correlation coefficient indicates an inverse relationship such that when one parameter is increased the other decreases. The module compares, at step 712, the correlation coefficients to a threshold value to determine whether the selected parameter is correlated to each of other unselected parameters. As the correlation coefficient approaches 1, the parameters are more highly correlated while parameters are less correlated as the correlation coefficient approaches 0. The threshold value, which may be defined by the administrator of the wagering network 108 or determined by an algorithm, represents the boundary between correlated parameters and non-correlated parameters. Therefore, if the correlation coefficient exceeds the threshold value, the parameters are determined to be correlated such that the change in one parameter will result in a proportional change in other correlated parameters. In the example, a threshold value is predefined as 0.75 by an administrator of the wagering network 108. The Pearson correlation formula is used to calculate a correlation coefficient for the increase in wager frequency in response to an increase in odds payout which results in a correlation coefficient of 0.83. The correlation coefficient is greater than the threshold value, therefore an increase in wager frequency is correlated to an increase in odds. The correlation coefficient on an increase in wager frequency in response to an increase in reward points awarded for a wager is 0.16 which is less than the 0.75 threshold value, therefore the increase in wager frequency is not correlated with an increase in reward points. Alternate methods of comparing parameters may be used including convolution or regression. The module saves, at step 714, correlations to the incentive database 130. The correlations including a pair of parameters, the correlation coefficient representing the strength of the correlation, and a time stamp indicating the time at which the correlation was saved to the incentive database 130. The correlations may additionally include a regression which can be used to predict the increase in one parameter needed to increase the other parameter. In the example, the correlation of wager frequency and odds with a correlation coefficient of 0.83 is saved to the incentive database 130 on Jun. 20, 2020 at 14:22:28. The module checks, at step 716, if there are more parameters which have not been evaluated for correlation if none of the correlation coefficients for the previously selected parameter are greater than the threshold value. Each parameter should be evaluated for correlation with each other parameter, and if this condition is not met, then another parameter which has not been evaluated should be selected and the previous two steps repeated with the new selected parameter. In the example, having completed correlations for wager frequency, the module identifies that at least the wager amount parameter has not been evaluated for correlations. The module selects, at step 718, the next parameter which has not been evaluated for correlation. The next parameter is taken from the available parameters from the historical wager data. The module further returns to step 710 to calculate correlation coefficients for each pairing of the now selected parameter and all unselected parameters. In the example, the module selects the wager amount parameter, as it has not been evaluated for correlation, and returns to step 710.

FIG. 8 illustrates the incentive database 130. The incentive database 130 stores correlations identified by the incentive assessment module 128. A correlation is a combination of parameters and a correlation coefficient such that the correlation coefficient represents the degree to which a first parameter has an impact on a second parameter. The incentive database 130 is used by the incentive module 126 to determine incentives to offer to a user to increase the user's wager frequency or wager amounts. FIG. 8A shows an example of non-correlated parameters comparing an increase in wager frequency resulting from an increase in reward points. The correlation coefficient is 0.16. When compared to a threshold value of 0.75, defined by the administrator of the wagering network 108, the correlation coefficient is less than the threshold value and therefore it is determined that an increase in wager frequency is not correlated with an increase in reward points. FIG. 8B shows an example of correlated parameters comparing an increase in wager frequency resulting from an increase in odds. The correlation coefficient is 0.83. When compared to the threshold value of 0.75, the correlation coefficient is greater than the threshold value and therefore it is determined that an increase in wager frequency is correlated with an increase in odds. FIG. 8C shows an example of non-correlated parameters comparing an increase in wager amount resulting from an increase in the value of physical rewards. The correlation coefficient is 0.18. When compared to the threshold value of 0.75, the correlation coefficient is less than the threshold value and therefore it is determined that an increase in wager amount is not correlated with an increase in the value of physical rewards. FIG. 8D shows an example of correlated parameters comparing an increase in wager amount resulting from an increase in the number of sweepstakes entries offered to a user. The correlation coefficient is 0.78. When compared to the threshold value of 0.75, the correlation coefficient is greater than the threshold value and therefore it is determined that an increase in wager amount is correlated with an increase in the number of sweepstakes entries offered to a user.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of providing a wagering game for a single play in a live sporting event on a play-by-play wagering network, comprising executing on a processor the steps of:

configuring the play-by-play wagering network to provide in-play sports wagers on the single play in the live sporting event, the live sporting event comprising a plurality of single plays, wherein the play-by-play wagering network is connected to a gaming device through a cloud network, the cloud network comprising a bettor database;

classifying bettors as large bettors by a classification module based on behavior of the bettors in a predetermined amount of time as large bettors in excess of a wager frequency threshold and/or a predetermined wager amount on bets in a wager amount threshold;

storing classification of the large bettors in the bettor database;

transmitting, to the gaming device, a command to display the wagering game over the play-by-play wagering network and through the cloud network, the wagering game comprising a graphical user interface configured to display an in-game wager and configured to receive input from a bettor;

transmitting, to the gaming device, a command to display one or more first odds for the in-play wager on the single play in the live sporting event in the wagering game based on the classification of the large bettors stored in the bettor database;

transmitting, to the gaming device, a first notification that an incentive has been earned based on the classification of the large bettors stored in the bettor database, wherein the first notification is displayed to a plurality of the bettors; and transmitting, to the gaming device, a second notification of one or more second odds for the in-play wager on the single play in the live sporting event, wherein the second notification is displayed to the plurality of the bettors, and wherein the one or more second odds are different than the one or more first odds; and receiving, via input on the graphical user interface, the in-play wager comprising the one or more first odds or the one or more second odds.

2. A system for providing wagers for a play in a live sporting event on a wagering network system for incentivizing user interaction for in-play sports betting, comprising:

a wagering network configured to provide in-play sports wagers on a live sporting event comprising a plurality of actions, wherein the wagering network is connected to a gaming device through a cloud network;

a classification module configured to classify bettors as large bettors based on activity of the bettors in a predetermined amount of time in excess of a wager frequency threshold and/or a predetermined wager amount on the bets in a wager amount threshold;

a large bettor database configured to store bettor data associated with the large bettors;

an incentive module configured to receive incentive information from an incentive assessment module that analyzes past wagers of the large bettors in the large bettor database to determine a specific incentive for the large bettors;

at least one processor; and at least one non-transitory memory having instructions stored thereon which, when executed by the at least one processor, direct the at least one processor to:

associate the specific incentive with the large bettors, cause the wagering network to create first odds for each action in the live sporting event, provide the specific incentive to the large bettors in the large bettor database to wager on an action in the live sporting event, the specific incentive comprising second odds different from the first odds for the action in the live sporting event, and provide instructions to display, on a graphical user interface displayed by the gaming device, a notification based on context of a single action of the plurality of actions in the live sporting event and past wagers of the large bettors in the large bettor database.

* * * * *